United States Patent
Holota et al.

(10) Patent No.: US 8,011,793 B2
(45) Date of Patent: Sep. 6, 2011

(54) WIDE FIELD FOUR MIRROR TELESCOPE USING OFF-AXIS ASPHERICAL MIRRORS

(75) Inventors: Wolfgang Holota, Bad Toelz (DE); Bernd Harnisch, Noordwijkerhout (NL); Volker Kirschner, Leiden (NL)

(73) Assignee: European Space Agency, Paris (FR)

( * ) Notice: Subject to any disclaimer, the term of this patent is extended or adjusted under 35 U.S.C. 154(b) by 475 days.

(21) Appl. No.: 11/792,970

(22) PCT Filed: Dec. 15, 2004

(86) PCT No.: PCT/EP2004/014255
§ 371 (c)(1), (2), (4) Date: Sep. 16, 2008

(87) PCT Pub. No.: WO2006/063605
PCT Pub. Date: Jun. 22, 2006

(65) Prior Publication Data
US 2009/0009897 A1    Jan. 8, 2009

(51) Int. Cl.
*G02B 23/06* (2006.01)
(52) U.S. Cl. ........................ 359/859; 359/399
(58) Field of Classification Search ............ 359/366, 359/399, 857–858, 861
See application file for complete search history.

(56) References Cited

U.S. PATENT DOCUMENTS

| | | | |
|---|---|---|---|
| 5,309,276 A * | 5/1994 | Rodgers | 359/366 |
| 5,477,395 A | 12/1995 | Cook et al. | |
| 5,640,283 A | 6/1997 | Warren et al. | |
| 5,686,728 A | 11/1997 | Shafer et al. | |
| 5,805,365 A | 9/1998 | Sweatt et al. | |
| 5,917,879 A * | 6/1999 | Mashima | 378/34 |
| 6,109,756 A * | 8/2000 | Takahashi | 359/857 |
| 6,767,103 B2 * | 7/2004 | Cook | 359/859 |
| 7,080,912 B2 * | 7/2006 | Cook | 359/859 |

FOREIGN PATENT DOCUMENTS

EP  1772761 A1 *  4/2007
WO  WO 01/77734  10/2001

* cited by examiner

*Primary Examiner* — Mark Consilvio
(74) *Attorney, Agent, or Firm* — Bachman & LaPointe, P.C.

(57) ABSTRACT

A telescope has an entrance pupil region; a first concave mirror (M1) belonging to a first rotationally symmetric aspheric surface and reflecting light passing through the entrance pupil region; a second convex mirror (M2) belonging to a second rotationally symmetric aspheric surface and reflecting light reflected by the first mirror; a third convex mirror (M3) belonging to a third rotationally symmetric aspheric surface and reflecting light reflected by the second mirror; a fourth concave mirror belonging to a fourth rotationally symmetric aspheric surface and reflecting light reflected by the second mirror to an exit pupil. The first, second, third and fourth rotationally symmetric aspheric surfaces are centered on the symmetry axis of the third mirror. The first, second and fourth mirrors are centered along the first direction perpendicular to the optical axis and off-centered in a second direction perpendicular to the symmetry axis and to the first direction.

7 Claims, 2 Drawing Sheets

WIDE FIELD FOUR MIRROR TELESCOPE USING OFF-AXIS ASPHERICAL MIRRORS

BACKGROUND OF THE INVENTION

1. Field of the Invention

The present invention relates to the field of optical instruments, and in particular to reflecting telescopes having an ultra-wide field of view, above 6°×6°.

Telescopes with ultra-wide field of view are designed for applications such as imaging in the visible and in the infrared spectral domain, spectral imaging, earth and planetary observation, and detection of fast moving faint objects.

2. Description of the Prior Art

One difficulty with all-reflective systems is to achieve good image quality over a wide field of view while minimizing the sizes of individual mirrors and the volume of the telescope package containing the mirror elements. A single mirror with an appropriately shaped surface is capable of forming a perfect geometric image of a single object point. The mathematical description of the surface of the mirror is dictated by the fundamental requirement that the length of any path from the object to the image be equal to the length of any other similar path. For an infinitely distant object point, for example, the theoretical figure which achieves perfect geometric imagery is the paraboloid of revolution. The ideal mirror shape produces the best possible geometric image quality for a given pair of object and image conjugate points. Errors in fabrication distort the actual mirror surface from the ideal shape and cause the size of the geometric image to grow, degrading the frequency content of the image. Even in the absence of errors, diffraction resulting from the finite size of the collecting mirror aperture places an ultimate lower diffraction limit on the size of the image spot for a given system. When the geometric image spot size from the ideal mirror shape with fabrication errors is smaller than the spot size caused by diffraction, the system is said to be diffraction limited. Optimum telescope systems operate near the diffraction limit to provide the highest resolution possible with the least degradation of the frequency content.

An extended object can be considered as a continuum of object points each of which is subject to distortion from perfect imaging by diffraction and optical aberrations. A single mirror surface is generally not capable of perfect imaging for more than one object point and image point. Except in special, impractical cases, a single mirror cannot form a perfect image of extended objects. Hence, optical systems must add additional reflective surfaces to provide near perfect imaging of extended objects. Additional surfaces provide additional degrees of freedom which define the shapes and locations of mirror surfaces. Thus, a multiple mirror system has a set of surfaces and spacings defining path lengths traversed by rays propagating from the object to the image. The path lengths for each point are equal for enough object points to span the required angular field of view. There is a design margin that does not significantly affect image quality because geometric spots need only be smaller than the diffraction limit. Design difficulty increases with an increase in the field of view of the object to be imaged because of the difficulty in maintaining equal path lengths for an increasing number of conjugate points. Additional mirror surfaces and more complex mirror surface shapes such as aspheric surfaces have been used to meet the demands of high quality imaging of large extended objects, or a large field of view for objects with infinite object distance. The manufacturing criticality in general increases if additional constraints are required for the optical system like flat image plane, low distortion and/or telecentricity.

Aspheric surfaces, which cannot be represented as part of a large sphere, include conic sections such as hyperboloids, paraboloids, ellipsoids and oblate spheroids. A conic section is one of several possible shapes derived from an intersection of a plane with a cone. There are also general aspherics, for which the shape of the surface is represented by a general polynomial equation in one of several established forms. The use of aspheric surfaces is well known. For example, ellipsoidal and hyperboloidal mirrors are described in U.S. Pat. No. 4,101,195. Both mild and strong aspherics have been used and are characterized by the extent of departure from spherical.

Aspheric surfaces are more difficult to manufacture than spherical surfaces and are more complicated to design as part of an optical system. Spherical mirrors are always rotationally symmetric because any section of a spherical mirror is the same as any other section. Aspheric surfaces can, however, replace several spherical surfaces for the purpose of reducing aberrations.

One prior art telescope with a wide linear field of view is shown and described in U.S. Pat. No. 4,240,707. In this prior art three-mirror-anastigmatic type telescope, high resolution imaging is achieved with an aperture stop centered on a convex secondary mirror and with concave primary and tertiary mirrors eccentric sections of larger symmetric parent reflective surfaces. The surfaces are typically aspheric, including for example, conic sections, depending on the field of view and image quality desired. With conic aspherics, linear fields of view of up to five degrees on a flat focal surface have been demonstrated. With general aspherics, linear fields up to 15 degrees have been demonstrated. The reflective triplet operates most effectively at focal lengths from three to six times the aperture size; that is, with focal ratios of f/3 to f/6. The focal ratio, often called the f-number, is the ratio of the focal length divided by the aperture diameter.

Four mirror systems are also known, for example, the one disclosed in U.S. Pat. No. 5,142,417. This document describes an f/12 to f/20 optical system with a large effective focal length. This system comprises spherical mirrors which are advantageously easy to manufacture, but disadvantageously have disjointed mirror axes resulting in a complex alignment of the telescope, in a difficult straylight baffling and in a relatively small angular field of view. The disjointed mirror axes also particularly increase system complexity and alignment requirements, presenting difficult manufacturing challenges.

U.S. Pat. No. 5,640,283 also discloses a four mirror system comprising two concave primary and tertiary mirror surfaces and two convex secondary and quaternary mirror surfaces. The tertiary and quaternary mirrors are spherical. The secondary mirror is a mild circular convex ellipsoid. This telescope is limited to a linear field of view of 5.6° and has a focal surface which is not flat but in the form of a concave cylinder section.

U.S. Pat. No. 6,767,103 also describes a four-mirror telescope with three aspheric mirrors and a spherical field mirror with a sequence concave, convex, convex, concave. This instrument is designed for high resolution imaging of a distant object, and has a narrow field of view of 0.4°×0.4°.

There is a need for a telescope having an ultra-wide field of view combined with a high imaging performance, a flat image focal plane, and a minimum distortion in all the field of view (image space), which is in addition telecentric in image space.

This means that the chief rays in image space for all field directions are parallel (the exit pupil of the system is located at infinity).

SUMMARY OF THE INVENTION

The present invention provides a telescope comprising:
an entrance pupil region,
a first concave mirror belonging to a first rotationally symmetric aspheric surface and reflecting light passing through said entrance pupil region,
a second convex mirror belonging to a second rotationally symmetric aspheric surface and reflecting light reflected by said first mirror,
a third convex mirror belonging to a third rotationally symmetric aspheric surface and reflecting light reflected by said second mirror,
a fourth concave mirror belonging to a fourth rotationally symmetric aspheric surface and reflecting light reflected by said second mirror to an exit pupil,
said first, second, third and fourth rotationally symmetric aspheric surfaces being centered on the symmetry axis of the third mirror, said first second and fourth mirrors being centered along a first direction perpendicular to said optical axis and off-centered in a second direction perpendicular to said optical axis and to said first direction.

According to a preferred embodiment of the invention, the third mirror defines the size and dimensions of the entrance aperture pupil.

According to a preferred embodiment of the invention, the third mirror defines the aperture stop of the telescope.

According to a preferred embodiment of the invention, the four mirrors have respective optical powers the sum of which is substantially zero so as to obtain a flat image focal surface.

According to a preferred embodiment of the invention, the third mirror has a circular shape whereas the first, second and fourth mirrors have a rectangular shape.

The invention will be more clearly understood and other features and advantages of the invention will emerge from a reading of the following description given with reference to the appended drawings.

DETAILED DESCRIPTION OF THE PREFERRED EMBODIMENT

Figure 1:
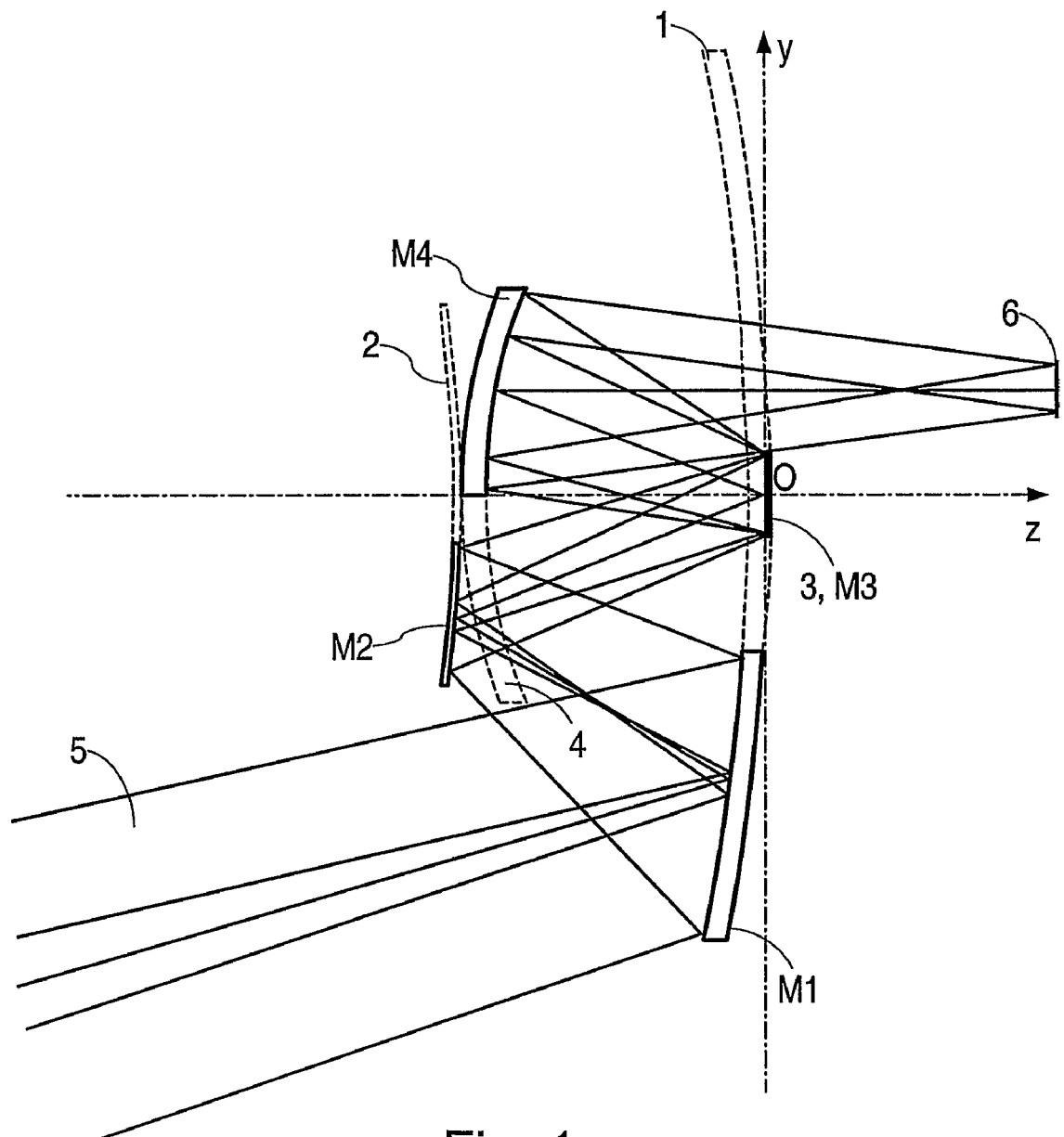
FIG. 1 is an elevational-view schematic ray path drawing of an optical system according to the invention.
Figure 2:
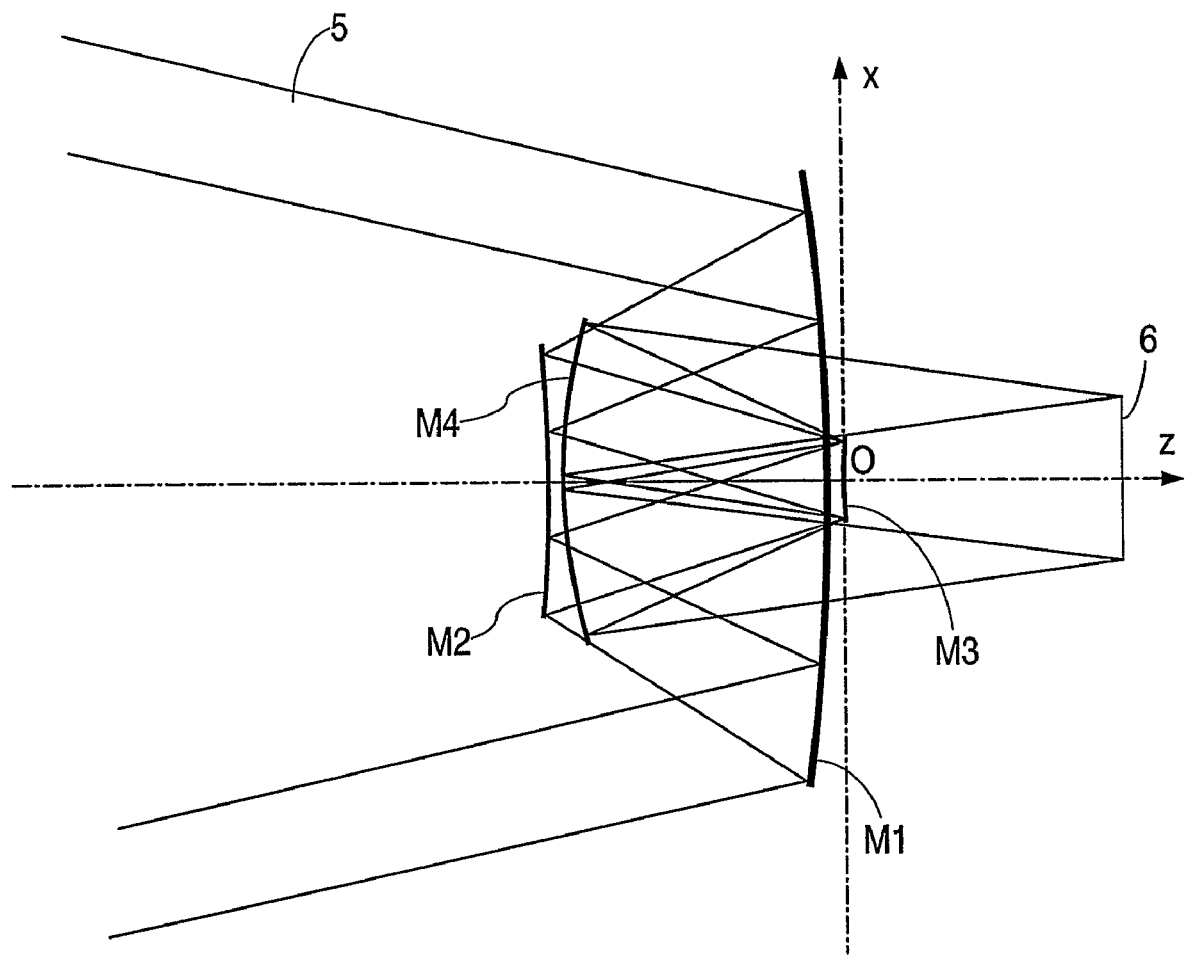
FIG. 2 is a plan-view schematic ray path drawing of the optical system of FIG. 1.

FIGS. 1 and 2 are ray path drawings of an all-reflective optical system according to the invention. The optical system comprises four rotationally symmetric aspheric mirrors M1 to M4 including a primary mirror M1, a secondary mirror M2, a tertiary mirror M3 and a quaternary mirror M4, all being positioned to reflect a beam path 5 to an image plane 6.

The beam path 5 is first reflected by the primary mirror M1 to the secondary mirror M2, which in turn reflects the beam to the tertiary mirror M3. Then, the beam is reflected by the tertiary mirror M3 to the quaternary mirror M4, which in turn forms an image in the focal plane 6. The primary and quaternary mirrors are concave, whereas the secondary and tertiary mirrors are convex. Preferably, the sum of the optical powers of the four mirrors is substantially zero, so that the image formed at the image plane 6 is planar.

The aspheric surfaces 1, 2, 3, 4 (shown in dashed lines in FIG. 1) of the four mirrors have a same optical or symmetry axis Oz coinciding with the symmetry axis of mirror M3. Thus the alignment of the mirrors can be achieved easily.

Mirrors M1, M2 and M4 are off-centered in a direction y perpendicular to z axis (FIG. 1), and centered in a direction x perpendicular to the plane Oxz (FIG. 2), mirrors M1 and M2 being disposed below the plane Oxz, whereas mirror M4 is placed above this plane. The diameter of the circular shape of mirror M3 is chosen to define the aperture stop and the entrance aperture of the telescope. The advantage of having the aperture stop coinciding with a mirror allows an effective straylight baffling.

With respect to a three mirror telescope, a four mirror telescope provides additional degree of freedom enabling the telescope to satisfy more design constraints (e.g. larger field of view, telecentricity, low distortion, and lower manufacturing criticality).

The rotationally symmetric aspheric surfaces of the mirrors can be defined by the following formula:

$$z = \frac{c \cdot r^2}{1 + \sqrt{1 - (1+K) \cdot c^2 \cdot r^2}} + \sum_{i=1}^{n} C_i \cdot r^{2i+2} \qquad (1)$$

where:

$r = \sqrt{x^2 + y^2}$, (x, y, z) are the coordinates of a point of the mirror surface from the center O of the latter, axis Oz being the symmetry axis of the surface, $c = 1/R$, R being the apex radius of the aspheric surface and having a sign positive or negative indicating respectively whether the curvature center of the aspheric surface is localized from the aspheric surface apex in the direction of z axis or in the opposite direction thereof (axis z having the direction of the incident rays in the telescope), K is a conical constant, and $C_i$ (i=1 to 4) are aspherical constants.

In an exemplary embodiment of the invention of a telescope with an effective focal length of 500 mm, values of constants R, K and $C_i$ defining the rotationally symmetric aspheric surface of each mirror are set in the following table:

TABLE 1

|  | M1 | M2 | M3 | M4 |
| --- | --- | --- | --- | --- |
| R (mm) | −3565.96 | −2341.512 | 927.696 | 807.857 |
| K | 8.115610 | 4.275200 | 0 | −0.225786 |
| $C_1$ (mm$^{-3}$) | −2.70865 E-11 | −5.45677 E-10 | −1.95206 E-10 | 7.93987 E-11 |
| $C_2$ (mm$^{-5}$) | 3.14594 E-17 | −3.47241 E-16 | −8.22925 E-16 | 1.41338 E-16 |
| $C_3$ (mm$^{-7}$) | 4.06319 E-24 | 0 | 0 | −5.15897 E-23 |
| $C_4$ (mm$^{-9}$) | 0 | 0 | 0 | 9.07704 E-28 |

Mirrors M1, M2 and M4 are manufacturable with state of the art polishing technology (e.g. computer controlled polishing and ion beam figuring). Mirror M3 which is the less critical mirror can be manufactured using classical polishing techniques.

The respective shapes, sizes and positions along axis y of the mirrors and positions along axis z of the vertex of the aspheric surfaces of the mirrors can be set as follows:

TABLE 2

|  | M1 | M2 | M3 | M4 |
|---|---|---|---|---|
| Shape | Rectangular | Rectangular | Circular | Rectangular |
| x size (mm) | 848.116 | 375.762 | 115.157 | 446.803 |
| y size (mm) | 385.662 | 187.536 | 115.157 | 275.787 |
| y position (mm) | −397.451 | 156.475 | 0 | 140.192 |
| z position (mm) | 0 | −400 | 0 | −399.3808 |

The image focal plane 6 is located 780 mm from the center O of mirror M3 along axis z. Values of Tables 1 and 2 are given with a possible variation of +/−10%.

The choice of parameters as defined in Tables 1 and 2 leads to a telescope having the following properties:
field of view between −13° and +13° (26°) in x direction,
field of view between −19° and −13° (6°) in y direction,
effective focal length=500 mm,
f-number (focal length/aperture diameter)=3.5,
telecentricity in image space,
transmission ratio greater than 80%,
flat image plane.

The telescope according to the invention is suitable for pushbroom super- or hyperspectral imaging missions and for Earth observation missions with a very large swath. It is also suitable for being used as a front telescope of a spectrometer with a very large slit or multi slit configuration.

The invention claimed is:

1. A telescope comprising:
an entrance pupil region;
a first concave mirror (M1) belonging to a first imaginary axially symmetric aspheric surface and reflecting light passing through said entrance pupil region;
a second convex mirror (M2) belonging to a second imaginary axially symmetric aspheric surface and reflecting light reflected by said first mirror;
a third convex mirror (M3) belonging to a third imaginary aspheric surface axially symmetric about a symmetry axis z and reflecting light reflected by said second mirror;
a fourth concave mirror (M4) belonging to a fourth imaginary axially symmetric aspheric surface and reflecting light reflected by said third mirror and passing through an exit pupil;
wherein said third mirror is axially symmetric about the symmetry axis z, and
said first, second, third and fourth axially symmetric aspheric surfaces being centered on the symmetry axis z of the third mirror, said first, second and fourth mirrors being centered about a first plane formed by said symmetric axis z and a first direction perpendicular to said symmetry axis z and off-centered in a second plane perpendicular to said first plane along said symmetry axis z.

2. The telescope according to claim 1, wherein the third mirror (M3) defines the size and dimensions of an entrance aperture pupil.

3. The telescope according to claim 1, wherein the third mirror (M3) defines an aperture stop of the telescope.

4. The telescope according to claim 1, wherein the four mirrors (M1, M2, M3, M4) have respective optical powers the sum of which is substantially zero so as to obtain a flat image focal surface.

5. The telescope according to claim 1, wherein the third mirror (M3) has a circular shape whereas the first, second and fourth mirrors (M1, M2, M4) have a rectangular shape.

6. The telescope according to claim 1, wherein for a telescope scaled to an effective focal length of 500 mm, the respective aspheric surfaces (1, 2, 3, 4) of the four mirrors (M1, M2, M3, M4) are defined by the following values with a possible variation of +/−10%:

TABLE I

|  | M1 | M2 | M3 | M4 |
|---|---|---|---|---|
| R (mm) | −3565.96 | −2341.512 | 927.696 | 807.857 |
| K | 8.115610 | 4.275200 | 0 | −0.225786 |
| $C_1$ (mm$^{-3}$) | −2.70865 E-11 | −5.45677 E-10 | −1.95206 E-10 | 7.93987 E-11 |
| $C_2$ (mm$^{-5}$) | 3.14594 E-17 | −3.47241 E-16 | −8.22925 E-16 | 1.41338 E-16 |
| $C_3$ (mm$^{-7}$) | 4.06319 E-24 | 0 | 0 | −5.15897 E-23 |
| $C_4$ (mm$^{-9}$) | 0 | 0 | 0 | 9.07704 E-28 |

R being the apex radius of the aspheric surface and having a sign positive or negative indicating respectively whether the curvature center of the aspheric surface is localized from the aspheric surface apex in the direction of the incident rays in the telescope or in the opposite direction thereof,
K is a conical constant, and
$C_i$ (i=1 to 4) are aspherical constants.

7. The telescope according to claim 5, wherein the respective shapes, sizes and positions in said second direction (y) of the four mirrors (M1, M2, M3, M4) and positions along the symmetry axis z of the vertex of the aspheric surfaces (1, 2, 3, 4) of the mirrors are defined by the following values with a possible variation of +/−10%:

|  | M1 | M2 | M3 | M4 |
|---|---|---|---|---|
| Shape | Rectangular | Rectangular | Circular | Rectangular |
| x size (mm) | 848.116 | 375.762 | 115.157 | 446.803 |
| y size (mm) | 385.662 | 187.536 | 115.157 | 275.787 |
| y position (mm) | −397.451 | −156.475 | 0 | 140.192 |
| z position (mm). | 0 | −400 | 0 | −399.3808 |

\* \* \* \* \*